United States Patent [19]

Shabi et al.

[11] 4,116,164

[45] Sep. 26, 1978

[54] METHOD OF FISH FARMING

[75] Inventors: Fuad Aboodi Shabi, Chester; Richard Loxley Hibberd, Sheffield, both of England

[73] Assignee: Air Products and Chemicals, Inc., Allentown, Pa.

[21] Appl. No.: 853,376

[22] Filed: Nov. 21, 1977

Related U.S. Application Data

[63] Continuation-in-part of Ser. No. 687,800, May 19, 1976, abandoned.

[51] Int. Cl.² ............................................. A01K 63/00
[52] U.S. Cl. ........................................................ 119/3
[58] Field of Search ......................................... 119/2–5

[56] References Cited

U.S. PATENT DOCUMENTS 3,643,403  2/1972  Speece ..................................... 119/3
3,756,197  9/1973  Buss et al. ............................... 119/3

*Primary Examiner*—Jay N. Eskovitz
*Attorney, Agent, or Firm*—James C. Simmons; Barry Moyerman

[57] ABSTRACT

Fish farming method primarily for growing fish such as trout wherein the rate of growth of fish can be accelerated by maintaining the dissolved oxygen (D/O) level throughout the entire fish farming water above saturation with respect to ambient air and, preferably, the D/O level is maintained between 150% and 250% saturation for the fish farming water and between 120% and 150% saturation for self-cleaning pools. The invention contemplates obtaining the D/O level by contacting the fish farming water with a gas comprising at least 25% by volume oxygen, balance, if any, consisting essentially of nitrogen. The method of the invention can be used for culturing of mollusks and crustacea.

7 Claims, 2 Drawing Figures

METHOD OF FISH FARMING

CROSS-REFERENCES TO RELATED APPLICATIONS

This application is a continuation-in-part of application Ser. No. 687,800 filed May 19, 1976 and now abandoned.

BACKGROUND OF THE INVENTION

1. Field of the Invention

This invention relates to a method of enhancing the rate of growth of aquatic life such as fish, mollusks and crustacea, and in particular to fish farming in which fish are grown in water which is artifically oxygenated.

An object of the invention is to increase the growth rate of fish, particularly trout, in commercial fish farms.

2. Prior Art

It is known to bubble air through the water of rivers, reservoirs, lagoons and aquaria in order to raise the level of dissolved oxygen therein.

In an article published in "Aquaculture" (April 1972) it is stated on page 323 that the optimum conditions for rearing salmonids occurs when air is bubbled through the water to maintain the dissolved oxygen level in the water between 80% and 100% saturation. The same article also states that it is undesirable to aerate the water so that the dissolved oxygen in the water exceeds 105%.

Fish farming or fish husbandry systems as they are sometimes called, are disclosed in U.S. Pat. Nos. 3,643,403, 3,756,197 and 3,996,893. The prior art patents disclose utilizing oxygen or an oxygen containing gas (e.g. air) injected into a confined body of water to raise fish.

U.S. Pat. No. 3,756,197 discloses using a hood to saturate the water under the hood with oxygen whereby the oxygen level under the hood could be in excess of 200%. However, U.S. Pat. No. 3,756,197 does not disclose maintaining the entire fish farming water at a level above saturation with respect to ambient air.

SUMMARY OF THE INVENTION

Our early experiments in replacing aerators with oxygenation systems indicated that the growth rate of fish grown in water having a dissolved oxygen level of 60% saturation induced by bringing the water into contact with pure oxygen was not significantly different from that induced by bringing the water into contact with the air.

In view of the information disclosed in the art and literature and the results of our early experiments, we were surprised to find that if the average dissolved oxygen level of fish farming water is maintained above saturation by bringing the water into contact with a gas comprising at least 25% (by volume) oxygen, the residue of the gas, if any, comprising mainly or consisting of nitrogen the rate of growth of the fish, particularly trout, can be accelerated by a surprising amount.

Accordingly, the present invention is characterized in that the artificial oxygenation is carried out by bringing the water into contact with a gas comprising at least 25% oxygen (by volume), the residue of the gas, if any, consisting of nitrogen or any other gas or gas mixture not harmful to the fish or acquatic life being grown, and being further characterized in that the average dissolved oxygen level throughout the entire body of water is maintained above saturation with respect to ambient air.

The term "saturation" as used herein refers to the maximum amount of oxygen which the fish farming water would absorb if allowed to come into equilibrium with air under the prevailing ambient conditions.

The dissolved oxygen level is preferably maintained above saturation throughout the entire time the fish are in the pool. This is not however essential and periods during which the dissolved oxygen level drops below saturation can be tolerated.

Our experiments have indicated that extremely favorable growth rates of trout can be achieved if the dissolved oxygen level in the entire body of fish farming water is kept between 150% and 250% saturated. It is however believed that levels between 120% and 150% saturation will provide excellent growth rates in self-cleaning pools where the oxygen demanded by organic waste is somewhat reduced with respect to conventional pools.

In accordance with the invention therefore, fish such as trout are disposed in a tank in which the average dissolved oxygen level exceeds saturation and under those conditions they can be grown to a marketable body weight without any reduction in fish population in the tank and far more rapidly than under natural conditions or in tanks enriched by conventional aeration. For example, trout growth to about 0.5lb under normal conditions takes about 18 months whereas growth to a similar weight in conditions maintained according to the preferred conditions stated hereinafter may take 10 months or less.

While the gas may comprise pure oxygen we have found that it may comprise as little as, but not less than, 25% oxygen. Preferably, the gas contains between 65 and 80% by volume oxygen.

DETAILED DESCRIPTION OF THE PREFERRED EMBODIMENTS

Figure 1:
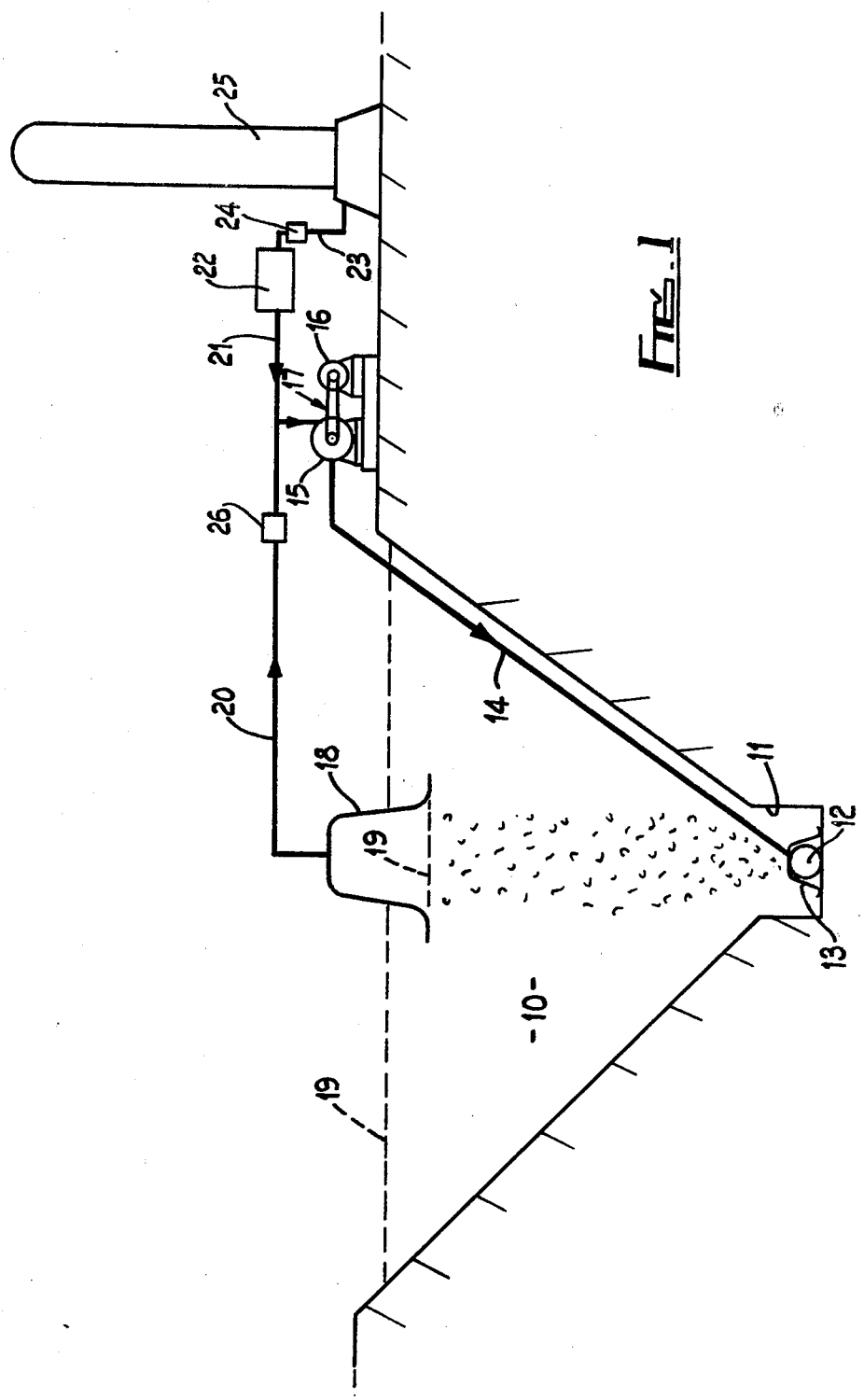
FIG. 1 is a schematic illustration of one practical form of apparatus used for the oxygenation of water in a tank or pond.

The prior art shows air has been used to maintain the D/O (dissolved oxygen) level in fish farming water at 105%. However, it has been our experience that many fish die under these circumstances. Although the biological reason is not fully understood, it is clear that if fish farming is to be carried out with D/O levels in excess of saturation, the level of nitrogen in the aeration gas must be reduced below 79%. While pure oxygen is ideal, it is known for certain that a gas mixture containing 65% oxygen and 35% nitrogen is satisfactory and it is surmized that a gas containing a maximum of 75% nitrogen by volume will be satisfactory for fish farming operations in waters less than 16 feet deep.

In the context of the present disclosure it should always be borne in mind that the D/O level in fish farming water is maintained substantially uniform throughout the entire body of water, with the exception of the immediate vicinity around the oxygen supply point, by the extremely efficient stirring action of the fish. Thus, in the present context the average D/O level is the D/O level at any point in the fish farming water.

Our invention stems from discovery that a minimum dissolved oxygen (D/O) level in the water which is above the saturation point of water at ambient temperature is required to grow fish efficiently. Furthermore, our discovery shows that extremely favorable growth rates of trout can be achieved if the dissolved oxygen level in the entire body of fish farming water is maintained between 150% and 250% saturation with respect to ambient air.

According to the literature, most prior art systems may have a D/O level of about 200% saturation in the immediate vicinity of the oxygen supply pipe but the oxygen content of the balance of the fish farming water is about 60% or less. U.S. Pat. No. 3,756,197 shows a system in which the oxygen distribution is, as far as can be ascertained from the teaching of the specification, about 200% under the hood and about 82% elsewhere in the fish farming water. One should note that the D/O level will be substantially uniform outside the hood of the device in the '197 patent because of the vigorous stirring of the water caused by movement of the fish. In looking at the '197 patent one can make the following calculations from the data given in Column 4, lines 8–65:

| A. | Calculation of D/O level of incoming water before oxygenation | |
|---|---|---|
| | Amount of oxygen used daily | = 18.9 lbs. |
| | 90% is absorbed | = 17.01 lbs/24 hours |
| | | = 0.0118125 lbs/min |
| | | = 5.3629 gms/min |
| | Flow rate of water into tank | = 100 gallons/min |
| | | = 454 litres/min |
| | Oxygen concentration due to injected oxygen dissolved in tube | = $\frac{5.3629}{454} \times 100$ |
| | | = 11.8125 mg/litre |
| | | = + 118% D.O. |
| | Since maximum D/O level recorded with hood | = 200% (Col. 4 line 11) |
| | D/O level of incoming water | = 200 − 118 = 82% |
| B. | Oxygen requirements of fish at 7° C (44.6° F) | |
| | Daily requirements of oxygen by 1790 lbs. rainbow trout at average temperature of 7° C. | |
| | | = 1790 × 24 × 60 × 7 × 10$^{-6}$ |
| | | = 18.04 lbs. |
| C. | Calculation of D/O level at outlet | |
| | Oxygen concentration decrease due to oxygen respired by fish | |
| | Outgoing D/O | = 82 − 0.66 = 81.34% (D/O) |

From the foregoing, it is obvious that while the '197 patent discloses supersaturating the water under the hood, it does not teach that this condition should be maintained throughout the fish farm thus enhancing the rate of growth of fish.

As shown in FIG. 1 of the drawings, there is provided a tank or pond 10 having a trough 11 at its base. The trough 11 extends over the length of the tank or pond and contains therein a diffuser pipe 12 having spaced apart holes therethrough along its length. Clamps 13 are spaced at several positions along the length of the pipe 12 to anchor it in position in the trough 11. At one end of the pipe 12 is provided a supply pipe 14 which extends out of the tank 10 and is connected to a water ring compressor 15 driven by a prime mover 16 via a belt and pulley (or chain and sprocket or shaft) drive 17.

Directly above the diffuser 12 and extending over the whole length of the tank or pond 10 is a gas collector hood 18. The hood 18 is adjustable in height and is positioned such that its open base will be located below the normal level of water contained in the tank or pond 10. The normal water level is indicated by the broken line 19. The hood 18 may be firmly held in position by means such as a framework or by anchors (not shown), or alternatively it may float, partially submerged, on the water. In the latter case it would be held in position over the diffuser, for example, by tie lines (not shown).

A re-circulating pipe 20 is provided from the hood 18 to the compressor 15. At a convenient position adjacent the compressor 15 a branch pipe 21 is joined to the pipe 20. The branch pipe 21 is connected to a pressure control valve 22 which responds to reduced pressure in the re-circulating pipe 20 by injecting pure oxygen through a pipe 23. Pure oxygen is supplied from an oxygen container 25 through a pressure reducing valve 24. A vent 26 is provided for purging.

In use, the water ring compressor 15 serves to pump oxygen enriched re-circulation gas (which typically comprises 65% to 75% oxygen, the residue comprising mainly nitrogen and small quantities of carbon dioxide) to the diffuser 12 via pipe 14. This re-circulation gas bubbles through water contained in the container 10 and some of the oxygen is absorbed into the water. All, or substantially all of the non-absorbed gas together with nitrogen displaced from the water by oxygen dissolving therein is collected under the collector hood 18.

A portion of the mixture in collector hood 18 is purged through vent 26 and the remainder is returned to the compressor 15 via the line 20. The total volume of gas in the re-circulation system is maintained constant by injecting pure oxygen into the line 20 from container 25 via the pressure control system 22 and the pressure regulator 24. The flow of make-up oxygen from the container 25 is conveniently automatically controlled in a manner such as to maintain the requisite concentration of oxygen in the gas pumped to diffuser 12 and hence maintain the dissolved oxygen level required in the water to support the aquatic life.

It has been ascertained that for a container capable of containing approximately 45,000 gallons of water, it is possible to maintain a dissolved oxygen level of up to 200% saturation throughout the water (that is not only under the hood 18). Oxygen utilization has been calculated to be of the order of 80%. To maintain the oxygen conditions just referred to in the water in the container 10, gas was supplied to the diffuser at about 130 SCFM using an 8 h.p. water ring compressor feeding a 6 inch diameter diffuser pipe 12. The diffuser pipe 12 was located about 5 feet below the water surface. The container measured 50 × 50 feet.

Clearly, the details set out above are by way of example only, and are not intended in any way to restrict the invention to containers, diffuser pipe and compressors of the dimensions and capacities quoted. Furthermore, it will be appreciated that the shape of container 10 illustrated is not the only shape that can be utilized.

Whilst a hood 19 which does not extend over the whole of the surface of the container 10 has been referred to, it is possible to provide a hood which, in fact, covers the whole surface of the container 10. In this case there would be no loss of gas from the surface of the pool.

Clearly it is possible, in commercial size apparatus to have a single oxygen supply for more than one container 10 and to use a single compressor 15 for pumping oxygen enriched recirculation gas to a plurality of tanks or ponds providing suitable balancing valve arrangements are employed to ensure that all of the tanks or ponds 10 receive the requisite volume of gas in unit time to support aquatic life adequately.

In such an arrangement the containers would be arranged in parallel, gas being supplied in each case to the respective diffuser to pass through the water and be collected for recycling.

It is also possible to have a series arrangement of containers 10 in which case gas collected in the hood 18 of the first container 10 would pass to the diffuser 12 of the second container, and so on, prior to re-cycling the gas and, when necessary, enriching it with oxygen from the source 25.

It is also possible, with a parallel arrangement to have one or more containers 10 in series in each individual 'limb' of the parallel arrangement.

Figure 2:
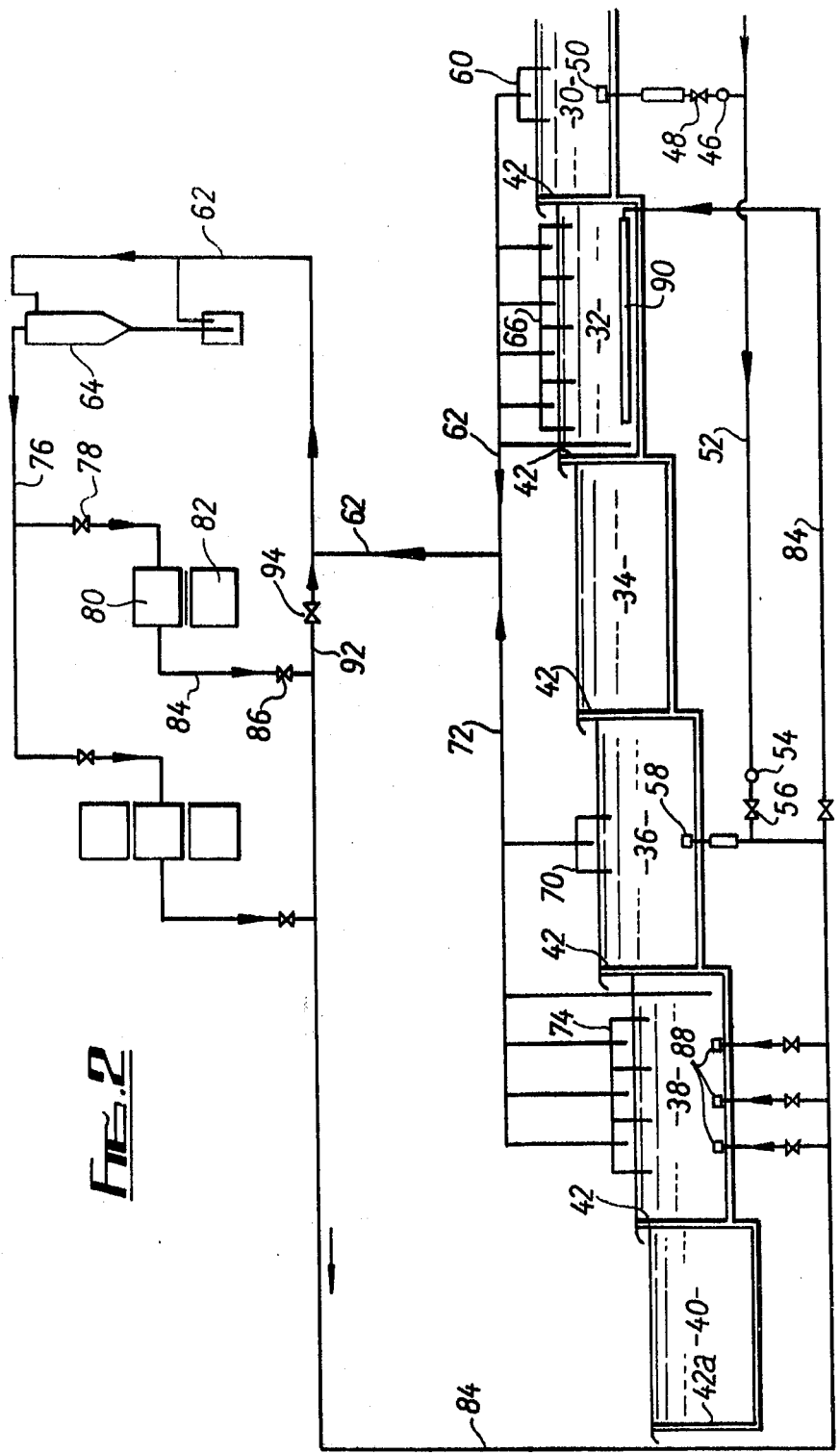
FIG. 2 is a schematic illustration of a system for oxygen enrichment of a series of tanks.

Referring now to FIG. 2, apparatus for fish farming comprises six tanks 30, 32, 34, 36, 38 and 40 arranged in a cascade series with tank 30 at the top of the series of the remaining tanks 32 to 40 at successively lower levels. The wall 42 of each tank that is adjacent the next succeeding tank constitutes a weir by which the level of water in each tank 30 to 38 is controlled. The level of water in tank 40 is controlled by a weir 42a similar to the walls 42 in preceding tanks.

An oxygen supply line 44 from an oxygen source (not shown) is connected through a pressure regulator 46 and valve 48 to a diffuser 58 located adjacent the bottom of tank 30. A branch line 52 from the oxygen supply line is connected through a pressure regulator 54 and valve 56 to a diffuser 58 located adjacent the bottom of tank 36.

A collector hood 60 is positioned at the top of tank 30 above diffuser 58 and is connected by suction line 62 to a cyclone 64. The suction line 62 is also connected to four collector hoods 66 arranged to cover the majority of the surface of water in tank 32. A collector hood 70 is positioned at the top of tank 36 and is connected by suction line 72 to suction line 62. Suction line 72 is also connected to three collector hoods 74 at the water surface in tank 38.

The outlet from the cyclone 64 is connected by line 76 through valve 78 to a compressor 80 driven by a motor 82. The compressor outlet is led by line 84 through valve 86 to diffusers 88 adjacent the bottom of tank 38 and diffuser 90 adjacent the bottom of tank 32. A by-pass line 92 connects line 84 with the suction line 62 through a valve 94.

In operation, oxygen is delivered to the diffusers 50 and 58 in tanks 30 and 36 respectively, to maintain the dissolved oxygen level as desired. The gas collecting in the hoods 60 and 70 (which typically comprises 90% to 95% oxygen) is drawn along lines 62 and 72 respectively, to the cyclone for removal of solids and liquids whereafter it is fed along line 84 to the diffuser 88 in tank 38 and diffuser 90 in tank 32. Gas collecting in hoods 66 and 74 (which typically comprises 60% to 70% oxygen) is also drawn into the suction line 62 and hence recirculated. The gas fed to diffusers 88 and 90 typically comprises 75% to 80% (by volume) oxygen.

The water in the tanks is not static. A continuous feed of water is introduced into tank 30 so that there is a continuous transfer of water from one tank to the next succeeding tank. Thus the dissolved oxygen level of the water depends not only upon the amount of oxygen introduced into the system, but also upon the water throughput. For example, if the water fed into the first tank 30 has a very low dissolved oxygen level and the rate of feed is high, correspondingly large quantities of oxygen gas will have to be supplied to diffuser 50 to raise the dissolved oxygen level in that tank. Moreover, in view of the transfer of water from one tank to the next, the water composition of tanks 32 to 40 is affected by the composition of water flowing thereinto from a preceding tank. In practice, therefore, the oxygen feed, both from the oxygen source and through recycle line 84 and the water flow rate is selected in order to achieve optimum dissolved oxygen levels in the various tanks for economically fast fish growth. Hoods 66 may, if desired, be provided with purging arrangements similar to vent 26 in FIG. 1. These are however unnecessary if the installation is designed so that a proportion of the bubbles leaving a diffuser escape to atmosphere.

The following example will illustrate the invention

EXAMPLE

Tanks 30, 32, 34, 36, 38 and 40 were each filled with water. Water was then fed into tank 30 at the rate of 200 gallons per minute. 200 gallons of water per minute therefore overflowed into tank 32 and so on to tank 40.

For the purpose of the test, the oxygenation apparatus shown in FIG. 2 was removed and tank 32 was provided with the apparatus shown in FIG. 1. Tanks 30, 34, 36 and 38 were each stocked with one ton of trout (which is the recommended stocking density for conventional fish farms) and tank 32 was stocked with three tons of trout (which is three times the normal stocking density). The composition of various tanks was substantially as shown in the following table.

| Sample | pH | PV mg/l | COD mg/l | BOD mg/l | mg/l Nitrogen Free + Saline $NH_3$ | Ox | Sus Sols mg/l | D.O. mg/l |
|---|---|---|---|---|---|---|---|---|
| Tank 30 | 7.2 | 5 | 13 | 5 | 0.8 | 1.5 | 11 | 7.4 |
| Tank 32 | 6.8 | 10 | 66 | 17 | 4.9 | 1.2 | 46 | 17.0 |
| Tank 34 | 7.1 | 9 | 51 | 16 | 5.4 | 1.2 | 41 | 8.7 |
| Tank 36 | 6.9 | 7 | 37 | 9 | 6.2 | 1.1 | 22 | 4.8 |

-continued

| Sample | pH | PV mg/l | COD mg/l | BOD mg/l | Free + Saline $NH_3$ | mg/l Nitrogen Ox | Sus Sols mg/l | D.O. mg/l |
|---|---|---|---|---|---|---|---|---|
| Tank 38 | 6.9 | 6 | 34 | 9 | 6.1 | 1.0 | 33 | 4.6 |
| Tank 40 | 6.8 | 7 | 34 | 7 | 6.4 | 0.9 | 15 | 6.6 |

As the fish grew, some were removed in accordance with normal fish farming practice so that the ratio of water passing through the tanks 30, 34, 36 and 38 to the weight of fish in each tank remained approximately constant at 200 gallons per ton of fish per minute. Similarly, the ratio of water passing through tank 32 to the weight of trout in tank 32 was maintained at approximately 66.67 gallons per ton of fish per minute.

Despite the high stocking density the trout in tank 32 reached a marketable weight of about 0.5 lb in about 10 months. Based on our previous experiments, it is estimated that the trout in the remaining tanks (which are still relatively small) will take the normal 18 months to grow to 0.5 lb.

The measurements for dissolved oxygen in the above table were taken at the surface of the tanks open to atmosphere and not underneath a hood.

The foregoing table shows the measurements for dissolved oxygen were taken from the surface of tanks open to atmosphere and not under the hood. In particular, tank 32 showed a dissolved oxygen level of 17 mg/l at the surface of the water. If the D/O level at the surface is in excess of saturation, the D/O level below the surface cannot be below saturation.

From the foregoing example and specification, it is evident that our invention contemplates fish farming where the D/O level is maintained at 200% saturation throughout the water.

Our experiments have indicated that there may be further advantages to fish farming in accordance with the invention, for example, the feed conversion ratio (1 lb feed/1 lb fish grown) may be lower than that of conventional aerated fish farms. Unfortunately, our experiments are not conclusive in this respect and this advantage may have been peculiar to our particular experiments.

For the avoidance of doubt, the term "fish" should be construed as including mollusks and crustacea.

Having thus described our invention what is desired to be secured by Letters Patent of the United States, is set out in the appended claims:

1. A method of accelerating the rate of growth of aquatic life such as fish, mollusks and crustacea comprising the steps of:

confining the aquatic life in a body of water wherein the level and oxygen content of the water can be controlled;

introducing a gas containing at least 25% by volume oxygen, balance nitrogen or other gas not harmful to aquatic life below the surface of said body of water allowing said gas to disperse through said body of water; and maintaining the dissolved oxygen level throughout said entire body of water at least 120% above saturation with respect to ambient air, whereby said aquatic life exhibits a faster rate of growth than in a conventional artificially oxygenated body of water.

2. A method according to claim 1 wherein said gas is used to maintain the dissolved oxygen level of said entire body of water between 150% and 250% saturation with respect to the ambient air.

3. A method according to claim 1, wherein said gas is used to maintain the dissolved oxygen level of said entire body of water between 120% and 150% saturation with respect to the ambient air.

4. A method according to claim 1, wherein said gas comprises between 65% and 80% oxygen.

5. A method according to claim 1, wherein excess oxygen containing gas is collected at a location spaced from the point at which it is introduced into said body of water, said collected gas being enriched with pure oxygen and reintroduced into said body of water.

6. A method according to claim 1 wherein said body of water comprises a plurality of separate tanks arranged in a stepwise descending cascade series so that water in the high tank flows through said tank and into the next lower tank in said series, at least said first tank of said series and every third tank thereafter in said series being adapted for introduction of said oxygen containing gas and for collecting excess oxygen containing gas.

7. A method according to claim 6 wherein the water in each next lower tank next to said tank receiving said oxygen containing gas is adapted for introduction of a gas comprising a mixture of excess oxygen containing gas enriched by pure oxygen.

* * * * *